May 15, 1956 | L. W. LOCKWOOD | Re. 24,153

FISHING REEL DRIVE

Orig. 2,713,274

Original Filed Feb. 16, 1953

INVENTOR.

Lawrence W. Lockwood

BY

Norman K. Huff

United States Patent Office

Re. 24,153
Reissued May 15, 1956

24,153

FISHING REEL DRIVE

Lawrence W. Lockwood, Spokane, Wash.

Original No. 2,713,274, dated July 19, 1955, Serial No. 336,963, February 16, 1953. Application for reissue September 22, 1955, Serial No. 536,058

5 Claims. (Cl. 74—750)

Matter enclosed in heavy brackets [ ] appears in the original patent but forms no part of this reissue specification; matter printed in italics indicates the additions made by reissue.

This invention relates to the broad class of fishing equipment and more particularly to a drive mechanism for fishing reels.

One object of the invention lies in the provision of a fishing reel drive which enables one to selectively choose one of two predetermined speed ratios intermediate the manually operated crank and the line spool.

Another object of the invention lies in the provision of a fishing reel drive which is self-contained in the crank handle of the reel and, therefore, is easily adapted to be applied to any conventional reel.

Another object of the invention lies in the provision of a fishing reel drive which comprises a minimum number of working parts constructed and arranged so that it may be assembled with facility and is not liable to become inoperative.

These and other objects of the invention will become apparent during the course of the following description.

In the accompanying drawings forming a part of this specification, and in which like numerals are employed to designate like parts, Figure 1 is a perspective view of a fishing reel embodying the drive which constitutes the subject matter of this invention;

Figure 1:
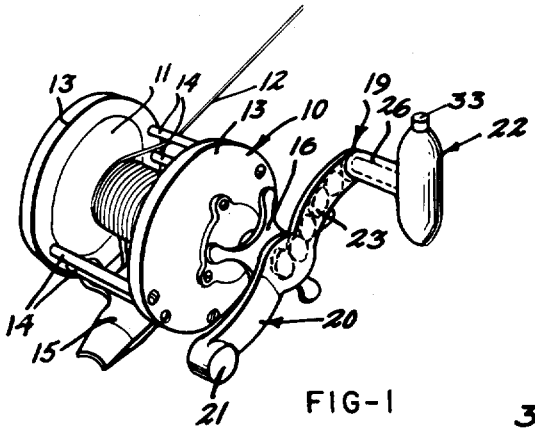

Referring now more particularly to the drawing, in Figure 1 I have indicated a conventional reel in general by the numeral 10. This reel includes the conventional spool 11, upon which the fishing line 12 is wound and unwound, and is journaled between spaced discs 13 which are secured in their relative positions by means of spacing bars 14 therebetween. The usual mounting bracket 15 is carried by the reel to releasably secure the reel to a rod and, as shown, the reel is provided with a conventional star drag mechanism 16.

Figure 2:
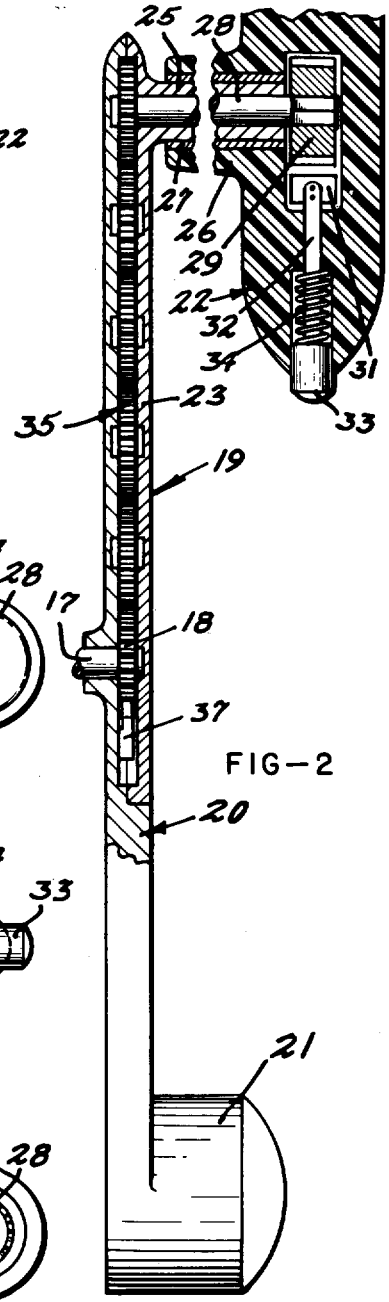
Figure 2 is a view of the crank handle partially in longitudinal cross section and partially in elevation and showing the drive.
Figure 3:
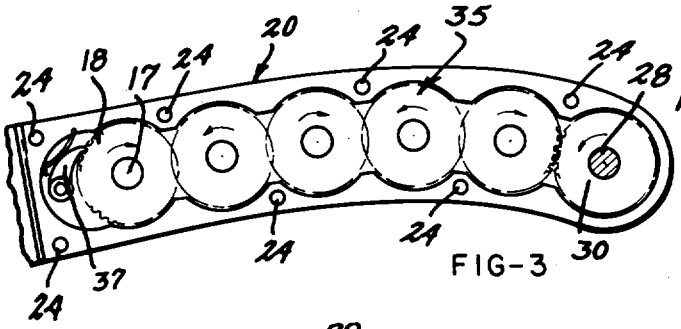
Figure 3 is a side elevation of the improved crank with the near portion of the housing removed.
Figure 4:
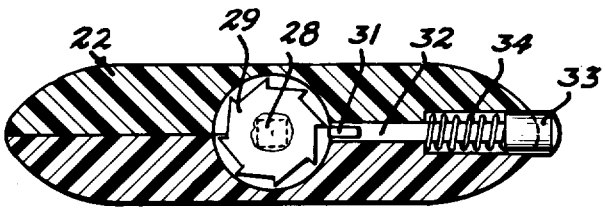
Figure 4 is a longitudinal cross section taken through the hand knob in a plane at right angles to that of Figure 2.
Figure 5:
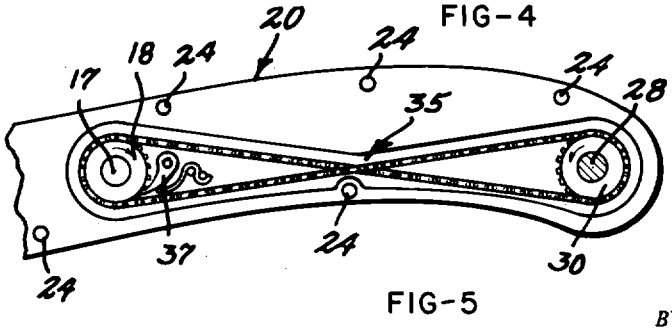
Figure 5 is a view similar to Figure 3 showing a modified power-transmitting mechanism.

To my knowledge every reel has a driving shaft to which the impelling crank or motor is secured. The fishing reel drive of my invention is to be secured to this shaft, which I prefer to term the central shaft indicated by the numeral 17. The location of the shaft on the reel, whether it be centric or eccentric, is immaterial insofar as it relates to this invention. The shaft 17 has fixed on its outer end a motion-transmitting element 18 which may be a pinion gear as indicated in Figure 2 or a sprocket as indicated in Figure 4. It will be understood that other acceptable motion-transmitting elements may be employed if desired.

The crank 19 comprises a crank arm 20 having a counterbalance 21 at one end and a hand knob 22 at the opposed end. This particular crank differs from the conventional crank in that it is provided with a sectional housing, a portion of which is integral with the body of the crank arm 20 and the other portion of the housing being a cover plate 23 which may be secured in any acceptable manner, such as by passing stud bolts through the cover plate and threading them into the sockets 24 formed in the other portion of the housing.

The cover plate 23 is provided adjacent its outer end with a tubular boss 25 disposed at a right angle to the longitudinal axis of the crank arm. The hand knob 22 is provided with an enlarged tubular boss 26 which encircles the boss 25 and is journaled thereon with a bronze or brass sleeve bearing 27 intermediate the two bosses.

Drive shaft 28 extends through the inner boss 25 and ends within the hand knob 22 and has fixed thereon a ratchet wheel 29. The opposed end of the drive shaft terminates within the crank arm 20 and has fixed thereon a second motion-transmitting element 30 which corresponds to the motion-transmitting element 18.

As indicated in Figure 4, the hand knob 22 is formed of sections and after the ratchet wheel 29 is placed upon the drive shaft 28 and the spring biased pawl 31 is placed in the handle, the sections are secured together as by an adhesive enclosing the ratchet wheel with the pawl 31. The pawl 31 is adapted to be selectively shifted into and out of locking engagement with the teeth of the ratchet wheel.

The pawl is carried by a plunger 32 which has a thumb button 33 on its outer end and is of such length as to dispose the thumb button partially protruding from the hand knob 22. A compression spring 34 is disposed intermediate the knob 22 and the button 33 to bias the pawl 31 outwardly to a position where it is disengaged from ratchet wheel 29.

Intermediate the previously described motion-transmitting elements 18 and 30, I have provided a motion-transmitting means indicated in general by the numeral 35. In Figure 2 this means takes the form of a train of idler gears, the end ones of which mesh with the pinion 18 and the drive gear 30, and in Figure 4 the means takes the form of a crossed sprocket chain 36. The number of idler gears employed in the motion-transmitting mechanism is relatively unimportant except that it is necessary that the motion of drive gear 30 be imparted to pinion gear 18 in the opposite direction, the same as if the two gears 18 and 30 were meshing one with the other, the reason for the small size of the idler gears being that the crank arm 20 may conform substantially to the conventional size of crank arms. By varying the size of one of the gears 18 or 30 the ratio between the shafts 28 and 17 may be varied.

As indicated in the drawing, with the gears 18 and 30 of the same diameter, one revolution of the hand knob 22 will impart one revolution to the central shaft 17. It will be understood that when the pawl is manually depressed in locking engagement with the ratchet 29, though the crank 19 is not rotated, rotation of the hand knob 22 in a counterclockwise direction, as viewed in Figure 1, will cause the central shaft 17 to rotate in a clockwise direction and thus drive the spool 11 to wind in the fishing line. Therefore, if the hand knob 22 is grasped and the pawl 31 locked with ratchet 29 and the crank arm rotated; by reason of the fact that the crank arm makes one revolution relative to the shaft 17 and the hand knob makes one revolution with relation to the crank arm 20, the central shaft 17 will be rotated two complete revolutions for each single revolution of the crank arm.

When the pawl 31 is released, the end one of the train of idler gears meshing with the pinion 18 walks around the pinion 18 and the shaft 28 freely rotates within the hand knob 22, thus imparting no movement to the shaft 17. To avoid disconnection of the pinion 18 entirely, I have provided a dog 37 pivotally carried by the crank arm 20 and resiliently urged into engagement with the motion-transmitting element 18 so that clockwise rotation of the crank arm will cause clockwise rotation of the shaft 17. Therefore, when the pawl 31 is disengaged from ratchet wheel 29, one revolution of the crank arm by means of hand knob 22 will impart one revolution to the central shaft 17. Upon depressing the pawl 31, each revolution of the crank arm 20 will impart two revolutions to the central shaft 17, thus increasing the speed ratio between the crank and the spool 11 while dog 37 ratchets over the element 18.

Having thus described my invention, I claim:

1. In a fishing reel having a spool, a drive comprising a central shaft for driving the spool of the reel; a manually operated crank carried by said reel; a pinion fixed on said shaft; a resiliently biased dog pivotally carried by said crank and engaging said pinion, whereby rotation of the crank in one direction drives said shaft; an even number train of idler gears carried by the crank and having an end one meshing with said pinion; a drive gear meshing with the end one of said train opposed to the pinion; a hand knob journaled on said crank; and manually operated means for selectively engaging and disengaging said knob and said drive gear.

2. In a fishing reel drive, a central shaft for driving the spool of the reel; a manually operated crank carried by said reel; a handle journaled on said crank and having a sprocket; means for selectively engaging and disengaging said sprocket and said handle; a sprocket fixed on said shaft; a crossed chain uniting said sprockets, whereby the second-named sprocket is driven in the opposite direction by said first-named sprocket; and means for driving the second-named sprocket by the crank and independent of the first-named sprocket when said first-named sprocket is disengaged from said handle.

[3. In a fishing reel having a spool, a two speed drive comprising a shaft for driving the spool of the reel; a manually operated crank rotatably carried by said reel; a handle journaled on said crank; a motion transmitting element rotatably carried by said handle; means for selectively locking together and releasing said element and said handle for selective simultaneous rotation; a second motion transmitting element fixed on said shaft and operably united to be driven by said first named element during rotation thereof relative to the crank; and means for driving the second named element by the crank and independent of the first named element when said first named element is released from said handle.]

[4. In a fishing reel having a shaft driving the spool of the reel, or self-contained two-speed reel crank comprising a manually operable crank journaled on said reel; a rotatable handle member journaled on said crank at a point removed from said shaft; a motion transmitting element journaled on said crank; means for selectively locking and releasing said element with respect to the handle; a second motion transmitting element fixed on said shaft and operably united to be driven by said first named element in the opposite direction during rotation of said handle relative to the crank; and means for driving the second named element by the crank and independent of the first named element when said first named element is released from said handle.]

5. In a fishing reel having a shaft driving the spool of the reel, a self-contained two-speed reel crank comprising a manually operated crank journaled on said reel; a pinion fixed on said shaft and disposed within said crank; an overrunning clutch operably uniting said pinion and said crank for simultaneous rotation in one direction; driving means journaled on said crank at a point removed from said pinion and *drivingly* [initially engaged] *interconnected* with said pinion to drive said pinion in the opposite direction during rotation; and manually operated means for selectively *fixing and freeing* [engaging and disengaging] said drive means *relative to said crank, whereby* [and] said pinion *is alternately free from influence of and driven by said drive means* during operation of said crank.

*6. In a fishing reel having a shaft driving the spool of the reel, a self-contained two-speed reel crank comprising a manually operated crank journaled on said reel; a motion transmitting element fixed on said shaft and disposed within said crank; an overrunning clutch operably uniting said motion transmitting element and said crank for simultaneous rotation in one direction; driving means journaled on said crank at a point removed from said motion transmitting element and drivingly interconnected with said motion transmitting element to drive said motion transmitting element in the opposite direction during rotation; and manually operated means for alternately fixing and freeing said driving means relative to said crank, whereby to selectively rotate said motion transmitting element during operation of said crank.*

*7. In a fishing reel having a shaft driving the spool of the reel, a two-speed reel crank comprising a manually operable crank journaled for rotation with respect to said reel; a motion transmitting element connected to rotate said shaft and disposed relative to said crank; an overrunning clutch operably uniting said motion transmitting element and said crank for simultaneous rotation in one direction; a handle journaled on said crank at a point removed from said motion transmitting element; and said handle having means operably engaged with said motion transmitting element to rotate said motion transmitting element in a direction opposite to the direction of rotation of the handle.*

References Cited in the file of this patent or the original patent

UNITED STATES PATENTS

| | | |
|---|---|---|
| 160,675 | Imbach | Mar. 9, 1875 |
| 1,122,500 | Henry | Dec. 29, 1914 |
| 2,054,823 | King | Sept. 22, 1936 |
| 2,517,776 | Feierabend | Aug. 8, 1950 |
| 2,540,338 | King | Feb. 6, 1951 |
| 2,641,136 | Marsden et al. | June 9, 1953 |
| 2,688,700 | Lewis | Sept. 7, 1954 |